(12) United States Patent
Hiner et al.

(10) Patent No.: US 8,414,676 B2
(45) Date of Patent: Apr. 9, 2013

(54) FILTER DEVICE FOR USE WITH MACHINE

(75) Inventors: Stephen David Hiner, Salisbury (GB); Michael T. Adams, Marietta, GA (US); Charles Edward Thomas Brake, Alton (GB)

(73) Assignee: General Electric Company, Schnectady, NY (US)

( * ) Notice: Subject to any disclaimer, the term of this patent is extended or adjusted under 35 U.S.C. 154(b) by 408 days.

(21) Appl. No.: 12/713,484

(22) Filed: Feb. 26, 2010

(65) Prior Publication Data

US 2011/0209622 A1    Sep. 1, 2011

(51) Int. Cl.
*B01D 49/00* (2006.01)

(52) U.S. Cl. ............ 55/529; 55/414; 55/495; 96/189; 96/222; 96/399

(58) Field of Classification Search ........... 55/495, 55/414, 529; 96/189, 222, 399
See application file for complete search history.

(56) References Cited

U.S. PATENT DOCUMENTS

| | | | | |
|---|---|---|---|---|
| 4,292,061 A | * | 9/1981 | Land | 55/493 |
| 5,102,436 A | * | 4/1992 | Grabowski | 55/483 |
| 2004/0194439 A1 | * | 10/2004 | Tang | 55/484 |
| 2005/0055930 A1 | | 3/2005 | Imbabi | |
| 2007/0022721 A1 | * | 2/2007 | Goupil | 55/309 |
| 2009/0130704 A1 | * | 5/2009 | Gyure | 435/41 |
| 2010/0064895 A1 | * | 3/2010 | Thurin et al. | 96/222 |

* cited by examiner

*Primary Examiner* — Jason M Greene
*Assistant Examiner* — Karla Hawkins
(74) *Attorney, Agent, or Firm* — Hoffman Warnick LLC; Ernest G. Cusick

(57) ABSTRACT

Solutions for improving efficiency of a filter device for use with a machine requiring clean airflow are disclosed. In one embodiment, the filter device includes: a filter housing about an airflow inlet of the machine, wherein the filter housing comprises an air-permeable filter media configured to filter particles from multi-directional airflow moving through a substantial portion of the filter housing into the airflow inlet.

20 Claims, 4 Drawing Sheets

FILTER DEVICE FOR USE WITH MACHINE

BACKGROUND OF THE INVENTION

The subject matter disclosed herein relates to a filter device for use with a machine. Specifically, the subject matter disclosed herein relates to a filter device for use with a machine requiring clean airflow that filters particles from the air so that the machine can operate efficiently.

There are certain types of machines that require a clean airflow in order to operate properly and efficiently. One example of this type of machine is a gas turbine. During operation of a gas turbine, a compressor draws in air from the surrounding environment and compresses the air into a combustion chamber. In the combustion chamber, the air is mixed with a supplied fuel that is ignited. This creates high temperature combustion gases that drive the gas turbine.

In order to operate efficiently, clean airflow must be provided to the airflow inlet of the gas turbine. A filtration system for a gas turbine usually has a filter device with a plurality of filters which remove foreign particles within the airflow, such as, but not limited to, dirt, debris, and other unwanted items. During operation of the gas turbine, these particles begin to accumulate on the filters and create a resistance against the airflow to the gas turbine. This resistance increases the pressure drop across the airflow inlet system and leads to a decrease in the efficiency of the gas turbine. Furthermore, replacement of the filters cannot occur until operation of the gas turbine is stopped.

BRIEF DESCRIPTION OF THE INVENTION

Solutions for improving efficiency, cost, construction time, filter life, and pressure loss of a filter device for use with a machine requiring clean airflow are disclosed. In one embodiment, the filter device includes: a filter housing about an airflow inlet of the machine, wherein the filter housing comprises an air-permeable filter media configured to filter particles from multi-directional airflow moving through a substantial portion of the filter housing into the airflow inlet.

A first aspect of the invention provides a filter device for use with a machine requiring a clean air flow, the filter device comprising: a filter housing about an airflow inlet of the machine, wherein the filter housing comprises an air-permeable filter media configured to filter particles from multi-directional airflow moving through a substantial portion of the filter housing into the airflow inlet A second aspect of the invention provides a machine requiring a clean airflow, the machine comprising: an airflow inlet; and a filter housing about the airflow inlet of the machine, wherein the filter housing comprises an air-permeable filter media configured to filter particles from multi-directional airflow moving through a substantial portion of the filter housing into the airflow inlet.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide for efficiently filtering particles for a machine requiring a clean airflow. As used herein, the example of a gas turbine will be used to describe aspects of the invention and the prior art. It is understood that a gas turbine is merely one example of a machine requiring clean airflow to which the teachings of the invention may be applied. For example, the teachings of the invention may be similarly applied to other machines such as steam or wind turbines. In any case, use of the term "machine" or "gas turbine" does not limit the teachings of the invention to such specific types of machines requiring clean airflow.

Figure 1:
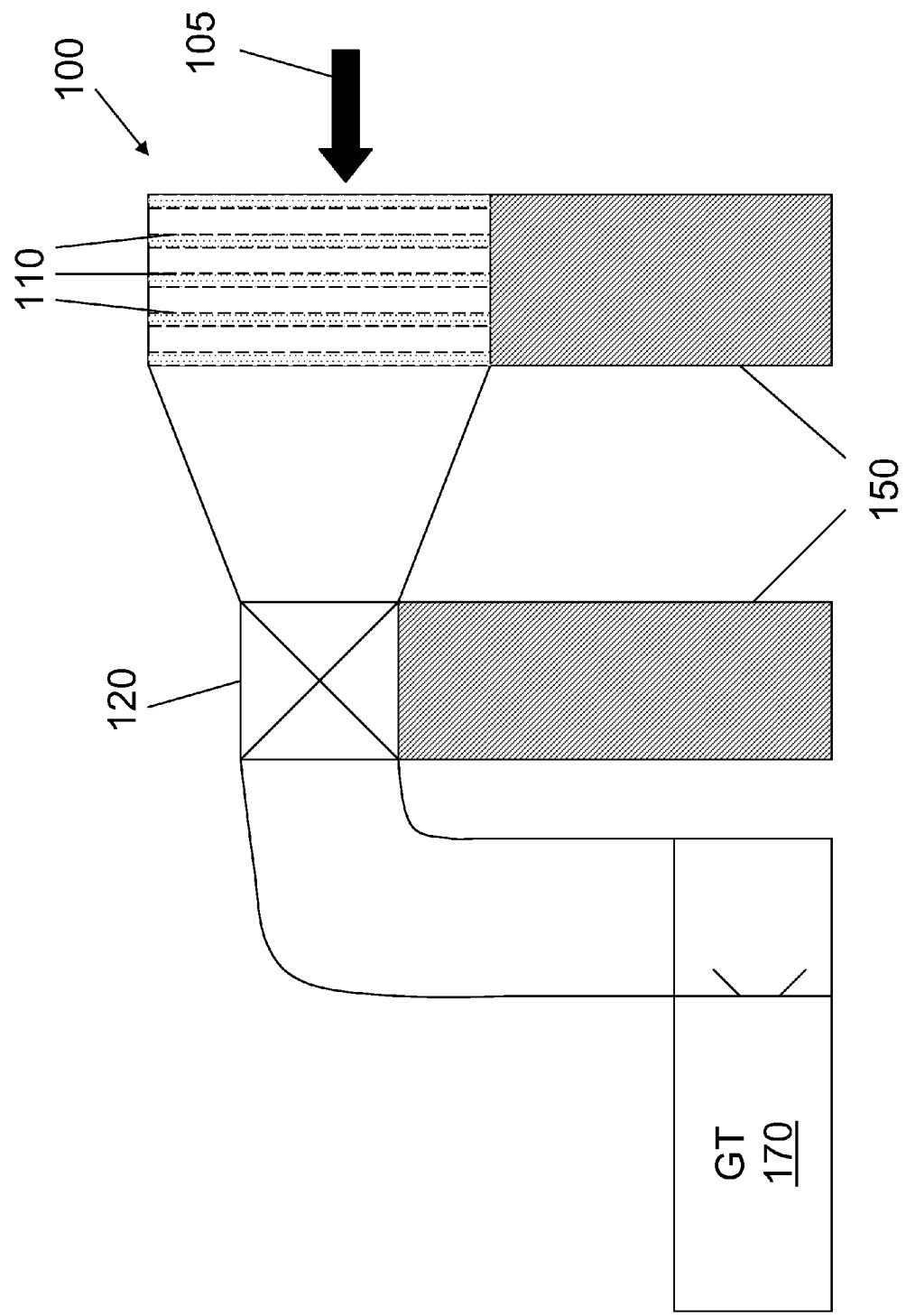
FIG. 1 shows a side view of a conventional filter device.

Turning to the drawings, FIG. 1 shows a side view of a conventional filter device 100 for use with a machine 170 requiring a clean airflow (illustrated as a gas turbine (GT) 170 merely as an example). Filter device 100 is shown including a plurality of filters 110 for removing foreign particles from airflow 105. Filter device 100 may be completely formed from a non-permeable material, such as steel, which is extremely expensive. In order to support filter device 100 and other portions of the conventional system (such as silencer 120), steel 150 may be provided. Moreover, filter device 100 and other components of a conventional system that are not discussed herein may be formed from steel (not illustrated). During operation of filter device 100, airflow 105 may flow through filters 110 which filter particles from airflow 105. As filters 110 are continually used, particles begin to accumulate on filters 110 which increases the resistance against airflow 105. This resistance may increase the pressure loss across the conventional system, which may cause machine 170 to do more work to overcome the resistance. This may lead to a decrease in the efficiency of machine 170. Further, once the resistance is too high, filters 110 must be replaced and operation of machine 170 must be halted in order to safely remove and replace filters 110. Filtration system 100 may include other components not illustrated in FIG. 1.

Figure 2:
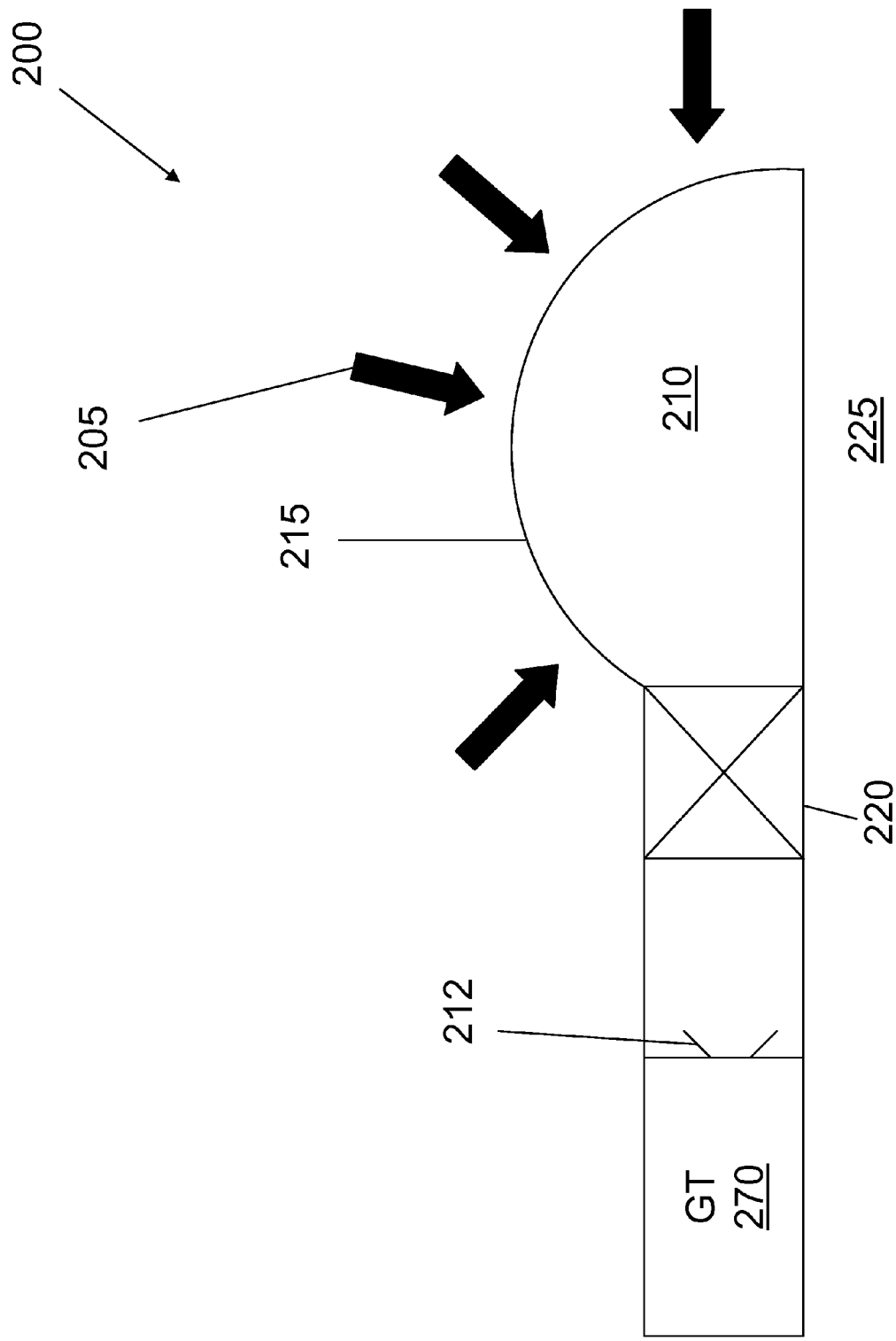
FIG. 2 shows a side view of a filter device according to one embodiment of the invention.

Turning to FIG. 2, a filter device 200 according to one embodiment of the invention is shown. However, it is understood that filter device 200 may include other components or other configurations not illustrated in FIG. 2. Filter device 200 may be for use with a machine 270, such as, but not limited to, a gas turbine, requiring clean airflow. Filter device 200 may include a filter housing 210 that may be about an airflow inlet 212 of gas turbine 270. Although silencer 220 is illustrated in FIG. 2 as between filter housing 210 and an airflow inlet 212, silencer 220 may be configured to be operable inside filter housing 210. Further, other components not illustrated in FIG. 2 may be configured to be operable inside filter housing 210, such as, but not limited, an evaporating cooler, a chiller, or a fogger.

Filter housing 210 may comprise an air-permeable filter media 215 configured to filter particles from multi-directional airflow 205. Multi-directional airflow 205 may move through a substantial portion of filter housing 210 into airflow inlet 212. In this case, filter housing 210 may have a large surface area that may allow for compressor (not shown) of gas turbine 270 to draw in multi-directional airflow 205 slower as compared to conventional filter device 100 shown in FIG. 1. Further, since multi-directional airflow 205 may be drawn in slower, air-permeable filter media 215 may be denser than traditional filters 110 in FIG. 1 to improve the filtration efficiency of filter device 200. Since filter housing 210 may comprise air-permeable filter media 215, instead of steel, as illustrated with conventional filter device 100 in FIG. 1, the cost of filter device 200 may be reduced. Also, since filter housing 210 may have a larger surface area, there may be a lower pressure loss and a longer filter life for air-permeable filter media 215.

Figure 3:
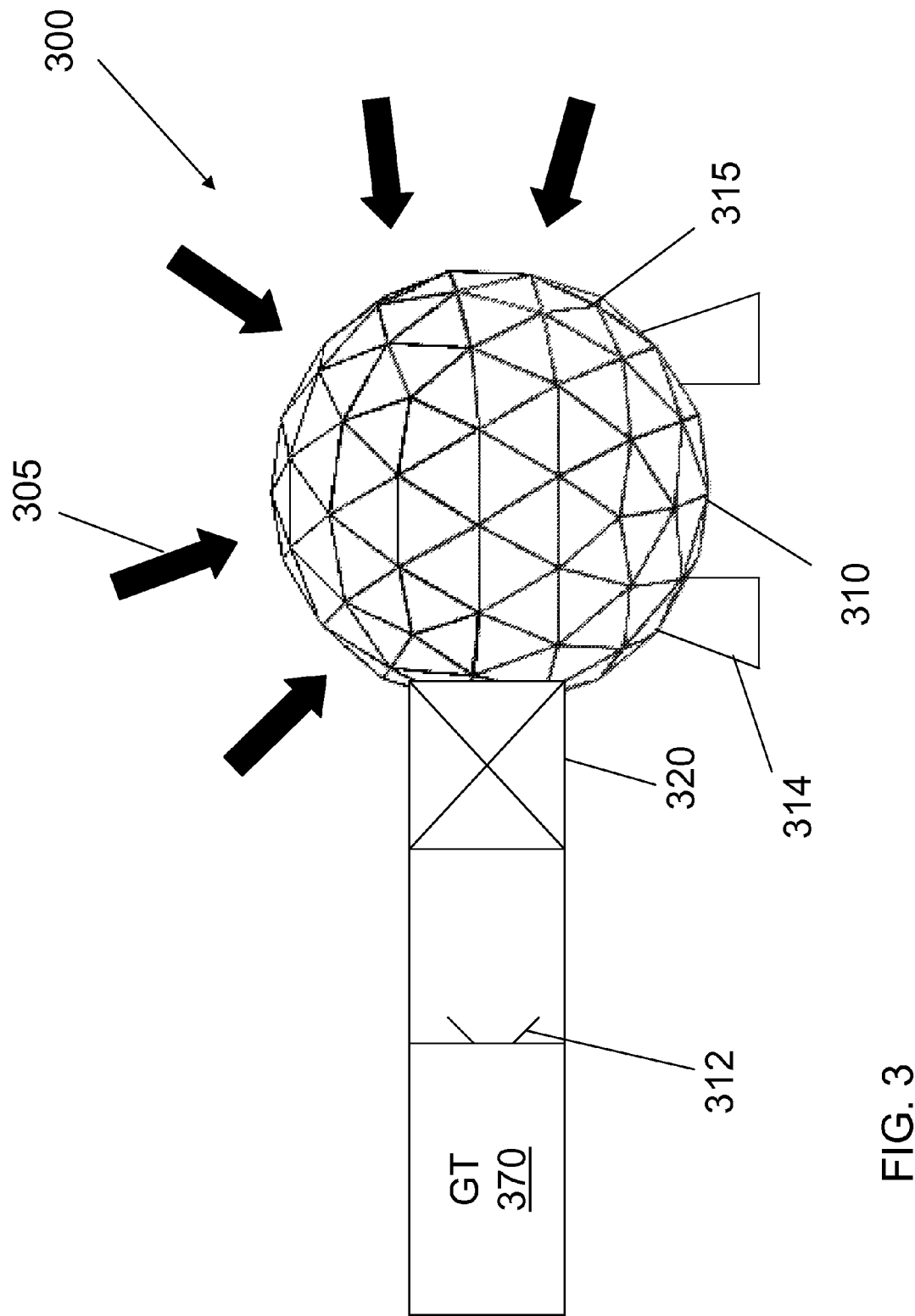
FIG. 3 shows a side view of a filter device according to one embodiment of the invention.

In the embodiment shown in FIG. 2, filter housing 210 may have a substantially semi-spherical shape. In this embodiment, filter housing 210 may enclose an area with the ground 225. Filter housing 210 may have any other shape, such as, but not limited to, a sphere, a cube, a cone, a cylinder, a dome, a triangular prism, etc. As shown in FIG. 3, an alternative embodiment of filter device 300 may include filter housing 310. Filter housing 310 may have a substantially geodesic dome shape and filter housing 310 may be supported by supporting structures 314.

Returning to FIG. 2, filter housing 210 may be configured to be any shape that may allow precipitation, such as rain or snow, to move along sides of filter housing 210 to clean off accumulated particles. Further, the shape of filter housing 210 may be configured to allow multi-directional airflow 205 to flow through filter housing 210 from any side, regardless of accumulated ice or snow. This may improve the filtration efficiency and reduce cost of replacing filter housing 210. Also, filter housing 210 may be configured as an inflatable tent or a supported fabric building.

Air-permeable filter media 215 may be made from any now known or later developed filter material. For example, air-permeable filter media 215 may be made from any type of glass-fiber material, such as wet-laid microfiber glass or glass/polymer synthetic mix or layers, or polymer-synthetic material, such as non-woven materials including: wet laid, dry laid, needle-punched, carded, spunbond, melt-blown, or solution spun materials, or such as woven materials including: canvas, singular or mixed component versions of Polypropylene, Polyester, Nylon, PET, PPS, Kevlar, or carbon fiber. The addition of composite or metal filament materials, such as Kevlar, carbon fiber, or steel, and the like, may provide mechanical strength to air-permeable filter media 215. Additional embodiments of air-permeable filter media 215 may include a mixture of glass, synthetic, and multi-layered fabrics that may contain either glass and/or synthetic materials. The multi-layered fabric of air-permeable filter media 215 may improve dust holding capacity, strength, and water drainage. Further, air-permeable filter media 215 may include a hydrophobic membrane material, a hydrophobic coating, or a surface treatment, such as an ePTFE membrane, a fluoropolymer-based hydrophobic coating, a nano-particular coating, or a plasma surface treatment, so that water from rain or snow will not penetrate filter housing 210. In an embodiment where air-permeable filter media 215 is not hydrophobic, air-permeable filter media 215 may include a hydrophobic lamination material so that filter housing 210 is hydrophobic. Examples of hydrophobic lamination material include an ePTFE membrane, a flouropolymer-based hydrophobic coating, a nano-particular coating, or a plasma surface treatment. Although air-permeable filter media 215 was discussed herein with regard to FIG. 2, it is understood that this discussion of air-permeable filter media 215 is applicable to other embodiments, including those shown in FIGS. 3 and 4.

Figure 4:
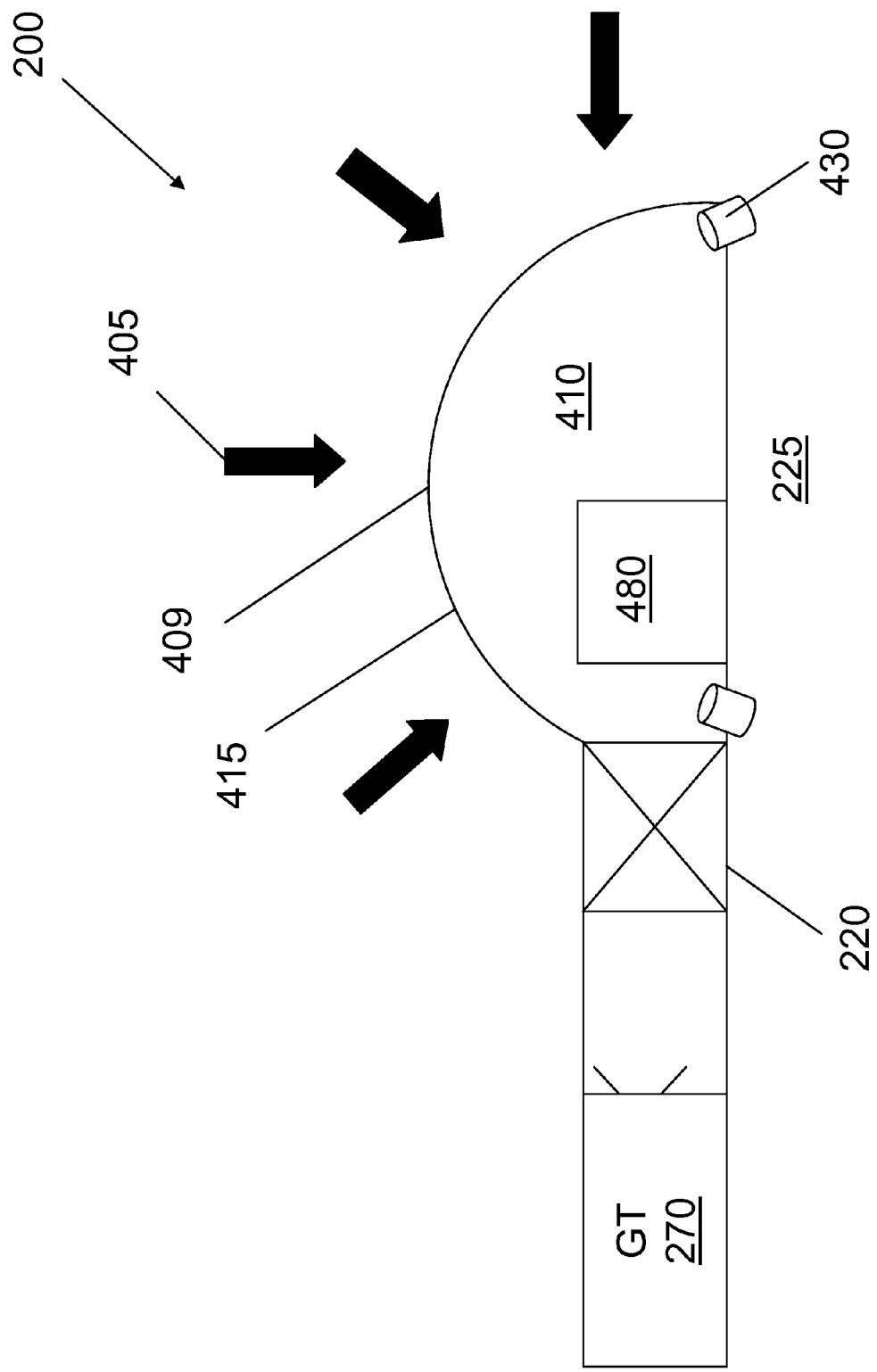
FIG. 4 shows a side view of a filter device according to one embodiment of the invention.

Turning to FIG. 4, an alternative embodiment of filter device 200 is shown. Filter device 200 may include (in addition to those features disclosed above with respect to FIG. 2) filter housing 410. In this embodiment, filter housing 410 may be flexible. Filter device 200 may also include a vibration device 480 for removing accumulated particles on air-permeable filter media 415. Accumulated particles may include particles in multi-directional air flow 405 and accumulated snow and/or ice. Vibration device 480 may also be used for breaking up ice or snow that may accumulate at a top 409 of filter housing 410. In operation, vibration device 480 may vibrate flexible filter housing 410, so that accumulated particles will run off flexible filter housing 410. Accumulated ice or snow will break up and run off flexible filter housing 410. Although vibration device 480 is only discussed herein with the embodiment of FIG. 2, it is understood that vibration device 480 is applicable to all other embodiments, including the embodiment shown in FIG. 3. Also, filter device 200 may include some other independent component to clean off accumulated particles or remove snow and ice, such as spray nozzles 430.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A filter device for use with a machine, the filter device comprising:
   a filter housing about an airflow inlet of the machine, wherein the filter housing substantially comprises an air-permeable filter media configured to filter particles from a multidirectional airflow moving through a substantial portion of the filter housing into the airflow inlet, wherein a portion of the filter housing directly contacts a ground surface.

2. The filter device of claim 1, wherein the filter housing has a substantially semi-spherical shape.

3. The filter device of claim 1, wherein the filter housing has a substantially geodesic dome shape.

4. The filter device of claim 1, wherein the filter housing is flexible.

5. The filter device of claim 1, further comprising a vibration device for vibrating the filter device and removing particles on the air-permeable filter media.

6. The filter device of claim 1, wherein the air-permeable filter media includes at least one of: a glass-fiber material or a polymer-synthetic material.

7. The filter device of claim 1, wherein the air-permeable filter media includes a hydrophobic membrane material.

8. The filter device of claim 1, wherein the air-permeable filter media further includes a hydrophobic coating.

9. The filter device of claim 1, wherein the air-permeable filter media includes a multi-layered fabric.

10. A machine, the machine comprising:
an airflow inlet; and
a filter housing about the airflow inlet of the machine, wherein the filter housing substantially comprises an air-permeable filter media configured to filter particles from a multidirectional airflow moving through a substantial portion of the filter housing into the airflow inlet, wherein a portion of the filter housing directly contacts a ground surface.

11. The machine of claim 10, wherein the filter housing has a substantially semi-spherical shape.

12. The machine of claim 10, wherein the filter housing has a substantially geodesic dome shape.

13. The machine of claim 10, wherein the filter housing is flexible.

14. The machine of claim 10, further including a vibration device for vibrating the filter housing and removing particles on the air-permeable filter media.

15. The machine of claim 10, wherein the air-permeable filter media includes at least one of: a glass-fiber material and a polymer-synthetic material.

16. The machine of claim 10, wherein the air-permeable filter media includes a hydrophobic membrane material.

17. The machine of claim 10, wherein the air-permeable filter media further includes a hydrophobic coating.

18. The machine of claim 10, wherein the air-permeable filter media includes a multi-layered fabric.

19. The filter device of claim 1, wherein the portion of the filter housing includes supporting structures for directly contacting the ground surface.

20. The machine of claim 10, wherein the portion of the filter housing includes supporting structures for directly contacting the ground surface.

* * * * *

UNITED STATES PATENT AND TRADEMARK OFFICE
CERTIFICATE OF CORRECTION

PATENT NO. : 8,414,676 B2
APPLICATION NO. : 12/713484
DATED : April 9, 2013
INVENTOR(S) : Hiner et al.

It is certified that error appears in the above-identified patent and that said Letters Patent is hereby corrected as shown below:

On the Title Page, in Item (73), under "Assignee", in Column 1, Line 2, delete "Schnectady," and insert -- Schenectady, --, therefor.

Signed and Sealed this
Twenty-eighth Day of May, 2013

Teresa Stanek Rea
*Acting Director of the United States Patent and Trademark Office*